United States Patent Office 2,748,159
Patented May 29, 1956

2,748,159

PURIFICATION AND DECOLORIZATION OF ESTERS

Anthony F. Finelli, Akron, Ohio, assignor, by mesne assignments, to The Goodyear Tire & Rubber Company, a corporation of Ohio No Drawing. Application September 8, 1952,
Serial No. 308,509

5 Claims. (Cl. 260—475)

This invention relates to the purification and decolorization of plasticizers and is particularly concerned with the purification and decolorization of organic ester plasticizers.

The manufacture of plasticizers which are generally used in the production of resinous or rubbery compositions, such as natural rubber products, synthetic rubber products and the various synthetic resin products, has been accompanied by the formation of certain impurities such as color bodies. These color bodies are very undesirable because they prohibit the production of light colored products.

Various attempts have been made to eliminate the color from plasticizers. These were unsuccessful in providing a substantially water-white product from a substantially non-aqueous viscous plasticizer.

The nature of the color bodies in these plasticizers has not been defined. It is possible that the color may be due to traces of dissolved ionic bodies which are carried over during distillation, or the color may be due to partial decomposition of the plasticizer during distillation.

The customary standard used to indicate the quantity or intensity of color contained in liquids, including plasticizers, is known as the A. P. H. A. standard color test. This test is one developed by the American Public Health Association which is known as the Hazen Platinum-Cobalt Scale, a description of which is found on page 2048 of the 5th edition of "Standard Methods of Chemical Analysis" by Wilford W. Scott.

It is an object of this invention to provide a method for the purification of plasticizers. It is another object of this invention to provide plasticizers which are substantially free from color bodies. It is a further object of this invention to provide a substantially water-white plasticizer by successively treating the plasticizer with an ion exchange material and a decolorizing material.

In the practice of this invention, plasticizers are treated with a cation exchanger, and thereafter the product of this treatment is put in intimate contact with a decolorizing material. Although the mechanism of the treatment has not been determined, it has been established that ion exchange treatment alone or treatment with a decolorizing material alone does not remove the color bodies. Also, it has been established that treatment with a decolorizing material followed by treatment with ion exchange material does not effect complete removal of the color bodies. So far as the individual steps are concerned, the usual conditions and techniques are employed.

Although the ion exchange treatment is conducted in a substantially non-aqueous system, traces of water may be present due to the hygroscopic nature of the ion exchangers. This water is held tenaciously by the ion exchanger because no apparent chemical change takes place in the plasticizer during the treatment, and the only noticeable physical change is a reduction in the quantum of color.

Viscous plasticizers of the type generally used as softeners for natural rubber, the various synthetic rubbers, and the various synthetic resins are generally the esterification products of high molecular weight acids. The invention can be used to treat any such plasticizer or mixtures of such plasticizers. Representative examples include the dialkyl esters of the ortho, meta and para phthalic acids represented by the general formula $$ROOC\text{—}C_6H_4\text{—}COOR$$

in which R is (1) an aliphatic group having from 1 to 20 carbons, e. g. dibutyl phthalate, (2) a straight chain containing from 3 to 20 carbons having side chain alkyl groups, e. g. di-2-ethylhexyl phthalate, (3) an alkyl aryl group having from 7 to 20 carbons, e. g. diphenethyl phthalate and dibenzyl phthalate, or (4) an alicyclic group, e. g. dicyclohexyl phthalate. The ortho phthalates are generally more readily available and constitute a preferred group. Further, plasticizers such as the aliphatic esters typified by dibutyl sebacate, dioctyl adipate and methoxyethyl oleate can be used in the practice of this invention. Generally, these ester plasticizers have molecular weights above 190, viscosities above 9 centipoises at 20° C., and boiling points above 150° C. at 4 millimeters of pressure.

The ester plasticizers are purified and decolorized by first being placed in contact with a cation exchange resin and then with an adsorbent material. The process can be a continuous operation by passing the plasticizer through successive beds of the indicated compositions. If desirable, the process can be carried out on a batch basis wherein the plasticizer is placed in contact with the reactants and then filtered to provide a separation.

Various well known cation exchangers can be used in the practice of this invention. Representative examples of such cation exchangers are organic compounds containing sulphonic, phosphonic, carboxylic or phenolic groups. Also, inorganic compounds such as the sodium aluminum silicates can be used.

Sulphonic acid type cation exchangers, which constitute a preferred class, can be prepared by various methods. For example, they may be prepared by copolymerizing a major portion of styrene and a minor portion of divinyl benzene and then sulphonating the polymerization products by reaction with sulfuric acid.

Phenolic resin type cation exchangers can be prepared according to known practices. For example, a polyhydric phenol may be reacted with formaldehyde to give a phenolic resin.

Carboxylic acid type cation exchangers can be made according to recognized procedures. For example, they may be made by reacting together resorcylic acid, formaldehyde and sodium hydroxide.

Resins which contain more than one of the indicated radicals are useful. For example, a resin containing sulphonic radicals and phenolic radicals can be prepared by condensing formaldehyde and phenol sulphonic acid together. Mixtures can be used if desired.

After the plasticizer has been treated with the cation exchanger, the ion exchanger can be retained for reuse and regenerated by processes known in the art.

After the cation exchange treatment, the filtered plasticizer, which still retains a certain amount of color, is treated with a decolorizing body.

Representative decolorizing agents, which can be used alone or as combinations, are neutral adsorbents such as activated charcoal, activated bone char, activated alumina, the oxides of magnesium, calcium and barium, talc, activated clays, pumice, powdered glass, sand, and limestone. Activated charcoal is a preferred material. After treatment with a neutral decolorizing body, the plasticizer can be filtered. The plasticizer is then water-white.

The invention is conveniently described with reference to the purification and decolorization of a commercial dioctyl phthalate by treating it with a polystyrene sulphonic acid resin, which can be prepared by polymerizing a mixture of styrene and divinyl benzene and then sulphonating the polymerization product by reaction with sulfuric acid. The ester is then treated with activated charcoal, which can be prepared by heating ordinary charcoal in the absence of oxygen. Such treatment results in dioctyl phthalate having an A. P. H. A. color rating of less than 10, although the starting material has a color rating of 100 or more.

The invention is further illustrated by the following examples.

Example 1

One hundred fifty grams of once distilled di-2-ethylhexyl phthalate having an A. P. H. A. color rating of more than 100 was treated at room temperature with 15 grams of a polystyrene sulphonic acid type cation exchange resin marketed by the Dow Chemical Company as Dow Ex–50. This mixture was shaken for 10 minutes and then allowed to stand for 15 hours. Thereafter, the ester plasticizer was separated from the cation exchange resin by filtration. The plasticizer was then placed in a container with 15 grams of activated charcoal. This mixture was heated to a temperature of 160° C. over a period of 1 hour while being slowly agitated. The hot reaction mixture was filtered to remove the charcoal. After allowing the plasticizer to cool to room temperature, no color could be detected on the A. P. H. A. scale.

Example 2

Five hundred grams of distilled di-2-ethylhexyl phthalate having an A. P. H. A. color rating of more than 75 was treated at room temperature with 70 grams of a polystyrene sulphonic acid type cation exchange resin marketed by the Dow Chemical Company as Dow Ex–50. This mixture was shaken for 30 minutes at room temperature and then allowed to stand overnight. After filtering the cation exchanger from the ester plasticizer, 45 grams of activated carbon were added to the ester plasticizer. The temperature of the mixture was raised to 160° C. over a period of 2 hours accompanied by slow agitation. The temperature was then allowed to recede to 120° C. at which point the charcoal was filtered from the dioctyl phthalate. The plasticizer so treated displayed no visible color and showed a 0 reading on the A. P. H. A. scale.

While certain representative embodiments and details have been shown for the purpose of illustrating the invention, it will be apparent to those skilled in this art that various changes and modifications may be made therein without departing from the spirit or scope of the invention.

I claim:

1. The process of purifying and decolorizing organic ester derivatives of a phthalic acid having molecular weights above 190, viscosities above 9 centipoises at 20° C. and boiling points above 150° C. at 4 millimeters pressure comprising the successive steps of treating said esters with a cation exchange material under substantially anhydrous conditions and then with a decolorizing material.

2. The process of purifying and decolorizing organic ester derivatives of an organic acid selected from the group consisting of phthalic acid, isophthalic acid and terephthalic acid having molecular weights above 190, viscosities above 9 centipoises at 20° C. and boiling points above 150° C. at 4 millimeters pressure comprising the successive steps of treating said ester derivatives with a cation exchange material under substantially anhydrous conditions and then with a decolorizing body.

3. The process of purifying and decolorizing organic liquid esters having the general formula

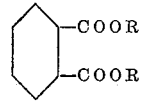

in which R is selected from the group consisting of straight chain aliphatic radicals having from 1 to 20 carbon atoms, branched chain aliphatic radicals having a chain of 3 to 20 carbon atoms and having alkyl side groups, aralkyl radicals having from 7 to 20 carbon atoms and alicyclic radicals, comprising the steps of treating said esters with organic cation exchange resin having at least one radical selected from the group consisting of sulphonic radicals, phosphonic radicals, carboxylic radicals and phenolic radicals, said treatment being conducted under substantially anhydrous conditions and then treating said ester with a decolorizing material selected from the group consisting of activated charcoal, activated clay, activated alumina, activated bone char, the oxides of magnesium, the oxides of calcium, the oxides of barium, talc, fuller's earth, pumice, powdered glass, limestone, and sand.

4. The process of purifying and decolorizing dioctyl phthalate comprising the steps of first treating said dioctyl phthalate with a polystyrene sulphonic acid under substantially anhydrous conditions and then with activated charcoal at a temperature substantially greater than the boiling point of water.

5. The process of purifying ester plasticizers having molecular weights above 190, viscosities above 9 centipoises at 20° C., and boiling points above 150° C. at 4 millimeters pressure comprising the steps of first treating said plasticizer with a cation exchange material under substantially anhydrous conditions and then treating said plasticizer with a neutral decolorizing body at a temperature substantially greater than the boiling point of water.

References Cited in the file of this patent

UNITED STATES PATENTS

| 2,130,014 | Jaeger et al. | Sept. 13, 1938 |
|---|---|---|
| 2,147,488 | Hickman et al. | Feb. 4, 1939 |
| 2,237,729 | Evans et al. | Apr. 8, 1941 |
| 2,444,589 | Blann | July 6, 1948 |
| 2,701,261 | Perry et al. | Feb. 1, 1955 |

OTHER REFERENCES

"Amber-hi-Lites," Pamphlet by Rohm & Haas, August 1949 No. 3 (67).